United States Patent
Grübel et al.

(10) Patent No.: US 10,424,985 B2
(45) Date of Patent: Sep. 24, 2019

(54) METHOD FOR PRODUCING A DYNAMOELECTRIC ROTARY MACHINE, AND DYNAMOELECTRIC ROTARY MACHINE

(71) Applicant: SIEMENS AKTIENGESELLSCHAFT, München (DE)

(72) Inventors: André Grübel, Fürth (DE); Bernhard Klaussner, Nürnberg (DE); Dieter Schirm, Breitengüssbach (DE); Matthias Übler, Ursensollen (DE)

(73) Assignee: Siemens Aktiengesellschaft, München (DE)

( * ) Notice: Subject to any disclaimer, the term of this patent is extended or adjusted under 35 U.S.C. 154(b) by 647 days.

(21) Appl. No.: 14/904,272

(22) PCT Filed: Jul. 8, 2014

(86) PCT No.: PCT/EP2014/064573
§ 371 (c)(1),
(2) Date: Jan. 11, 2016

(87) PCT Pub. No.: WO2015/004119
PCT Pub. Date: Jan. 15, 2015

(65) Prior Publication Data
US 2016/0156241 A1   Jun. 2, 2016

(30) Foreign Application Priority Data

Jul. 12, 2013 (EP) .................................... 13176305

(51) Int. Cl.
*H02K 3/48* (2006.01)
*H02K 3/34* (2006.01)
(Continued)

(52) U.S. Cl.
CPC ................ *H02K 3/48* (2013.01); *H02K 1/12* (2013.01); *H02K 1/22* (2013.01); *H02K 3/345* (2013.01);
(Continued)

(58) Field of Classification Search
CPC .............................. H02K 3/487; H02K 3/345
(Continued)

(56) References Cited

U.S. PATENT DOCUMENTS 1,279,810 A * 9/1918 Williamson ........... H02K 3/487
310/214
3,780,325 A * 12/1973 Frankenhauser ........ H02K 3/48
310/214
(Continued)

FOREIGN PATENT DOCUMENTS

CN    86108071 A    5/1987
CN    1627603 A    6/2005
(Continued)

*Primary Examiner* — Alexander Talpalatski
(74) *Attorney, Agent, or Firm* — Henry M. Feiereisen LLC

(57) ABSTRACT

The invention relates to a method for producing a rotor and/or a stator of a dynamoelectric rotary machine by means of the following steps: —producing pre-formed coils from an integral electrically conductive material or pre-insulated or coated electrically conductive wires, —fixing spacers to the pre-formed coil at predefinable intervals, —inserting the pre-formed coil, which is provided with spacers, into slots in a laminated core of a stator or rotor, —making contact with the individual pre-formed coils to form groups of coils and forming a winding system of a rotor and/or stator in accordance with a predefined circuit plan, —insulating the pre-formed coils or the winding system in the slots by complete encapsulation, in particular by complete vacuum encapsulation.

6 Claims, 2 Drawing Sheets

(51) Int. Cl.
  *H02K 15/12* (2006.01)
  *H02K 1/12* (2006.01)
  *H02K 1/22* (2006.01)
  *H02K 3/38* (2006.01)
  *H02K 15/02* (2006.01)
  *H02K 15/00* (2006.01)

(52) U.S. Cl.
  CPC .............. *H02K 3/38* (2013.01); *H02K 15/02* (2013.01); *H02K 15/12* (2013.01); *H02K 15/0018* (2013.01)

(58) Field of Classification Search
  USPC ........................................................ 310/214
  See application file for complete search history.

(56) References Cited

U.S. PATENT DOCUMENTS

| | | | |
|---|---|---|---|
| 3,943,392 A | | 3/1976 | Keuper et al. |
| 4,149,101 A | * | 4/1979 | Lesokhin ............... H02K 3/487 |
| | | | 174/DIG. 19 |
| 4,200,818 A | | 4/1980 | Ruffing et al. |
| 5,341,561 A | * | 8/1994 | Schorm ................... H02K 3/32 |
| | | | 29/596 |
| 7,670,653 B2 | | 3/2010 | Reussel |
| 7,687,963 B2 | | 3/2010 | Klaussner |
| 9,065,316 B2 | * | 6/2015 | Fubuki ..................... H02K 3/345 |
| 9,300,178 B2 | * | 3/2016 | Shiga ...................... H02K 3/345 |
| 2002/0014806 A1 | * | 2/2002 | Senoo ..................... H02K 3/345 |
| | | | 310/215 |
| 2008/0007134 A1 | * | 1/2008 | Shimura ................... H02K 3/44 |
| | | | 310/214 |
| 2008/0286505 A1 | | 11/2008 | Klaussner |
| 2008/0299359 A1 | | 12/2008 | Meuler |
| 2009/0267441 A1 | | 10/2009 | Hino |
| 2012/0256512 A1 | * | 10/2012 | Fubuki ..................... H02K 3/345 |
| | | | 310/215 |
| 2014/0042836 A1 | * | 2/2014 | Shiga ....................... H02K 3/30 |
| | | | 310/45 |

FOREIGN PATENT DOCUMENTS

| | | |
|---|---|---|
| CN | 161102062 A | 1/2008 |
| CN | 102656777 A | 9/2012 |
| DE | 100 63 146 A1 | 9/2001 |
| EP | 0 379 012 A | 7/1990 |
| EP | 0 466 893 A1 | 1/1992 |
| JP | S61189153 A | 8/1986 |

* cited by examiner

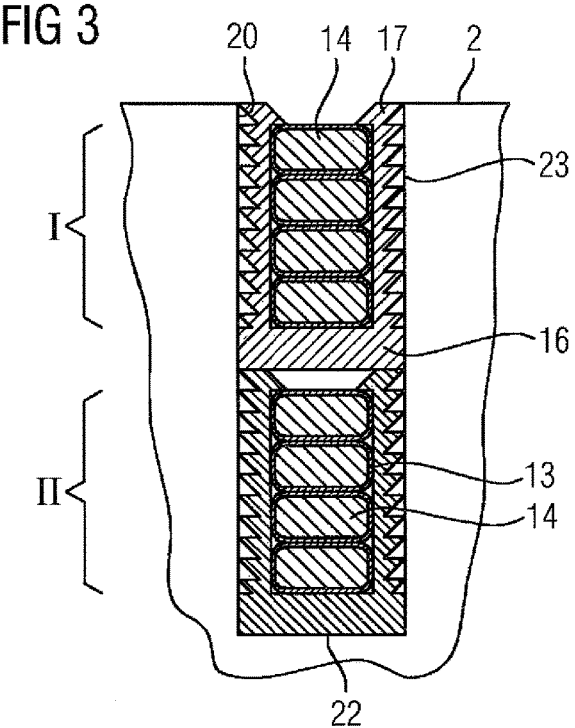
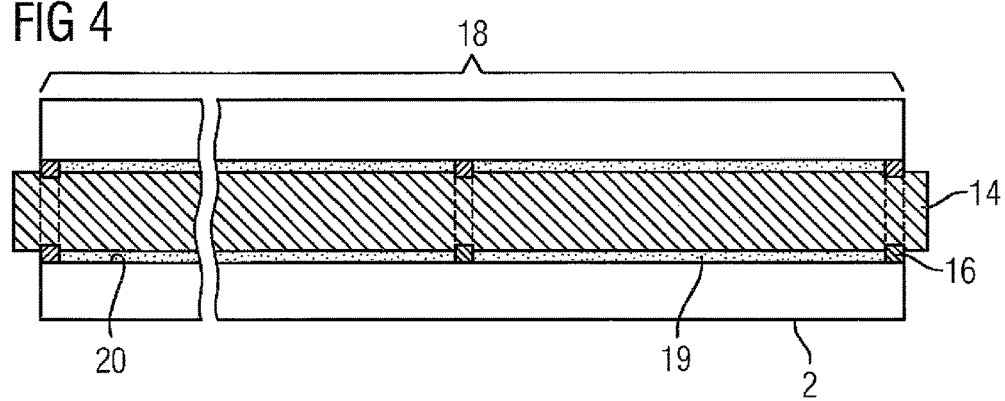

METHOD FOR PRODUCING A DYNAMOELECTRIC ROTARY MACHINE, AND DYNAMOELECTRIC ROTARY MACHINE

CROSS-REFERENCES TO RELATED APPLICATIONS

This application is the U.S. National Stage of International Application No. PCT/EP2014/064573, filed Jul. 8, 2014, which designated the United States and has been published as International Publication No. WO 2015/004119 and which claims the priority of European Patent Application, Serial No. 13176305.4, filed Jul. 12, 2013, pursuant to 35 U.S.C. 119(a)-(d).

BACKGROUND OF THE INVENTION

The invention relates to a method for producing a dynamoelectric rotary machine as well as to the dynamoelectric rotary machine itself.

Dynamoelectric machines, in particular dynamoelectric rotary machines, have a laminated stator core and a laminated rotor core in which electrical conductors are preferably located in the stator in axially running slots. The conductors interact electromagnetically with permanent magnets of the rotor or a live winding of the rotor and therefore ensure drive or regenerative operation of the dynamoelectric machine.

The electrical conductors in the axially running slots are separated from the ground potential of the stator or rotor laminated core by insulating materials. This is called main insulation.

The spacing is set by the number of layers, the tape-like insulating materials wound around the conductors, i.e. the pre-formed coils, and optionally additional surface insulating materials, as well as their respective thickness.

The wrapped coils are pressed or inserted into the slots in the stator or rotor, whereby these should then align themselves. To ensure that the inserted coils remain in the correct position they are then radially fixed by means of a slot blanking plate.

Production of a main insulation of this kind comprising mica tape or surface insulating materials is a time- and therewith resource-consuming and sometimes also very error-prone process.

SUMMARY OF THE INVENTION

Taking this as a starting point, the invention is based on the object of creating a method for insulating electrical conductors in slots which allows the insulation of windings, in particular the individual coils of a dynamoelectric machine in the slots, to be implemented in a manner that is less error-prone as well as comparatively more time-saving.

The solution to the posed object occurs by way of a method for producing a rotor and/or a stator of a dynamoelectric rotary machine by means of the following steps:
 producing pre-formed coils from an integral electrically conductive material or pre-insulated or coated electrically conductive wires,
 fixing spacers to the pre-formed coil at predefinable axial intervals,
 inserting the pre-formed coil, which is provided with spacers, into slots in a laminated core of a stator or rotor,
 making contact with the individual pre-formed coils to form groups of coils and forming a winding system of a rotor and/or stator in accordance with a predefined circuit plan,
 insulating the pre-formed coils or the winding system in the slots by complete encapsulation, in particular by complete vacuum encapsulation.

The solution to the posed object also occurs by way of a dynamoelectric rotary machine having a stator and/or rotor constructed from axially layered laminations, wherein slots of the stator and/or stator extend to an air gap located between stator and rotor, which slots are provided with pre-formed coils, wherein pre-formed coils that are each embedded in thermosetting encapsulation are provided in the slots, having integral electrically conductive material or pre-insulated or coated electrical conductive wires, wherein the pre-formed coils are held in the slots at least by spacers that are axially spaced apart from each other.

According to the invention the coils are fixed by pre-formed spacers, suitable for the specific slot, at axially predefined, regular, or also correspondingly irregular, intervals over the slot region of the coil. The slot region of the coil is the region of the coil which is located within the axial length of the laminated core of the stator or rotor. The intervals and number of spacers per slot depend on the total size of the pre-formed coils of the axial length of the stator or rotor and the cross-section of the pre-formed coils and/or slots thereof.

These spacers are distinguished in that they are preferably profiled at their lateral sides such that, after insertion of the pre-formed coils into the slot geometry of stator and/or rotor, these spacers may be detached again only with a significant application of force. This positioning of the spacers in the slot advantageously means that the pre-formed coils or other electrical conductors cannot be displaced during a subsequent casting process of insulating material into the slot. During operation of the dynamoelectric rotary machine this could then lead to electric flashovers and therewith to failure of the machine.

The coil is fixed to the spacer by frictional forces between the spacers and the coil surface or by catches on the recessed slot opening of the spacer.

The slot should advantageously be designed without a slot closure. The individual coils or the entire winding systems are/is now insulated by complete vacuum encapsulation with thermosetting compound. This is distinguished in particular by high electrical insulation properties between the electrical conductors and the earthed laminated core and by a good connection to the described spacers of the laminated core and the pre-formed coils of the entire strand insulation.

The inventive spacers themselves are advantageously made from thermosetting or thermoplastic materials and have, inter alia for control of the potential, predefinable spatial and quantitative inorganic and/or organic fillers.

For comparatively better connection to the encapsulation medium, these spacers have a corresponding surface finish. The surface is now roughened, porous or coated with adhesive materials, as well as soluble with respect to the encapsulation medium since, after curing of the encapsulation, the spacers no longer necessarily have to be present.

Mineral, high-filled compounds for highly compacted, dimensionally stable compressed forms or extruded sections or extrusion profiles may likewise be used in the spacers. Depending on the circumstances, these are assembled on the required length.

As a result of the new method the use of tape-like insulating materials as the main insulation of electrical conductors and wire bundles or pre-formed coils can now advantageously be omitted.

These electrical conductors can be installed on the individual pre-formed coils without laborious tape insulation processes.

By way of example, the following high temperature-stable thermoplastics and/or elastomers are used for the spacers: PAEK, PI, PES, PPS, PPA, PAA, PFA and the individual family members of the polyether ketones (PEK), such as PEKK, PEEEK, PEEKK and PEKEKK. The fillers each contribute up to 70 percent by volume and inside the high temperature-stable thermoplastics and elastomers have milled glass fibers, mica powder or metal oxides. The milled glass fibers have lengths of 10 μm to a maximum of 5 mm and lead to mechanical reinforcement. Longer glass fibers do increase the viscosity but make processing by injection molding more difficult. The milled glass fibers used can be processed directly with the extruder, so production of inventive spacers is simplified.

The grains of the mica powder as filler with diameters of <1 mm have an anisometric geometry.

The spacers are joined to the laminated cores in the slot by being pressing onto a hot slot inner side, for example PEK with laminated core at temperatures of more than 200° to 400° C., advantageously more than 300° C. and fess than 425° C., in particular between 325° C. and 400° C. as this is particularly advantageous for the PEK.

The spacers can also be fixed to the laminated core in the slot by using a temperature-stable adhesive, for example based on silicone (alkyd). The spacer can also be secured to the laminated core in the slot by frictional forces, for example by pressing into the slot and strengthening by the subsequent impregnation process.

The spacer can be profiled both toward the laminated core and/or coil. In addition to increased friction, profiling also has the advantage that the encapsulation can spread in the axial direction.

BRIEF DESCRIPTION OF THE DRAWING

The invention and advantageous embodiments of the invention can be found in the exemplarily illustrated embodiments, in which:

FIG. 3 shows the inventive principle,

FIG. 4 shows a longitudinal section.

DETAILED DESCRIPTION OF THE PREFERRED EMBODIMENTS

Figure 1:
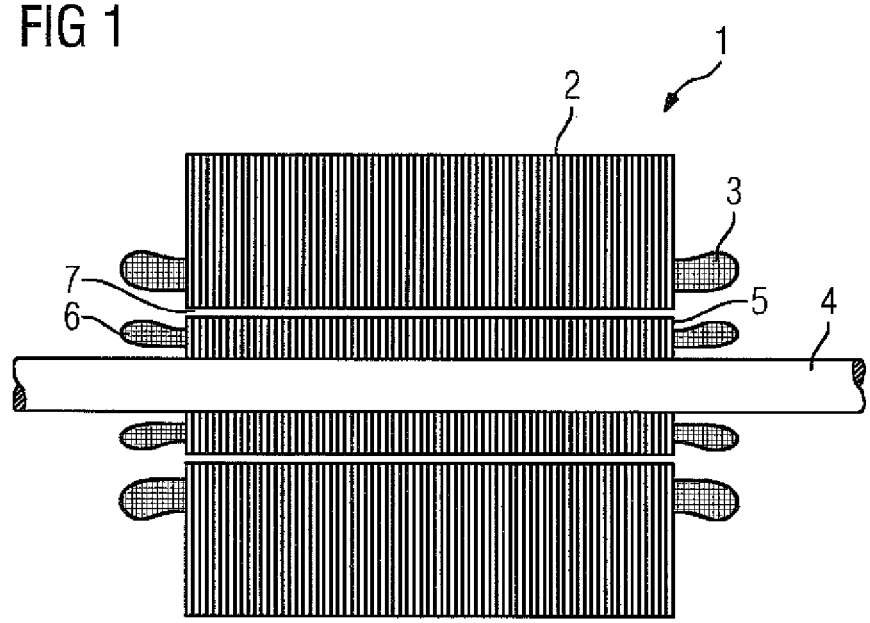
FIG. 1 shows the basic construction of a dynamoelectric rotary machine.

FIG. 1 shows the electrically active part of a dynamo-electric rotary machine 1 which has a stator 2, having an axially layered laminated core and a rotor 5 which is non-rotatably connected to a shaft 4, wherein the laminated core of the rotor 5 is also constructed with axial layers.

In this embodiment both the stator 2 and the rotor 5 each have a winding system 3, 6 which is arranged in axially running slots 20 (not visible in this view). The winding systems 3, 6 form winding heads at the end faces of stator 2 and rotor 5.

Figure 2:
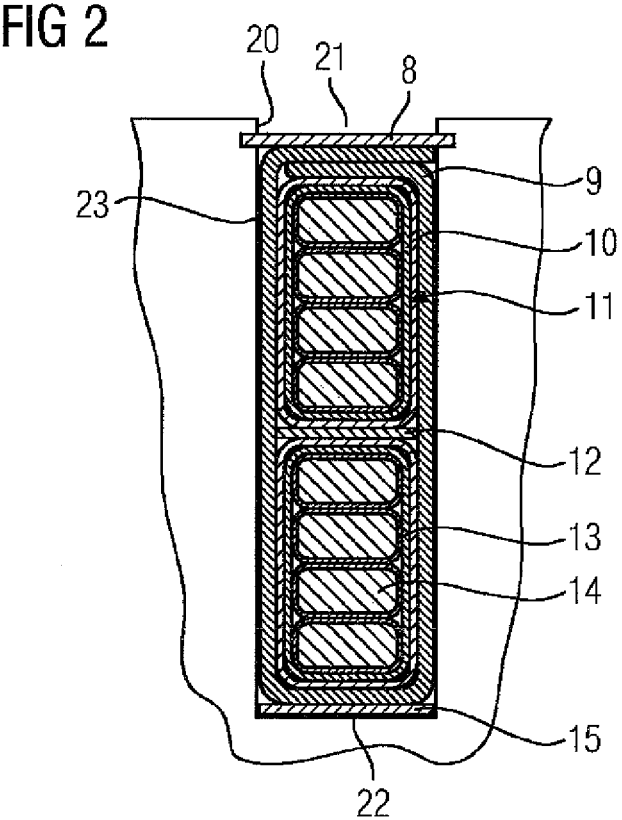
FIG. 2 shows a previous method of insulation.

FIG. 2 shows a cross-section of a slot 20 which has a winding system 3 of a stator 2 which has a two-layer construction. A first layer with a conductor I is located directly at the slot opening 21 which points toward the air gap 7 of the dynamoelectric rotary machine 1. Present in the slot 20 are therefore two conductors I and II which each have a plurality of strands 14 which are arranged radially one above the other in this exemplary embodiment. During operation of the dynamoelectric rotary machine 1 currents of different phases U, V, W flows through conductors I and II. Currents of the same phase flows through the strands 14 of one conductor I or II. The strand insulation 13 is therefore comparatively thin as it is only exposed to voltage differences of different windings of the coils of one conductor I or II.

In this diagram according to FIG. 2, which is intended to illustrate the conventional method, the slot 20 is covered further by a slot bottom strip 15 on which the slot finer 9 rests as the main insulation of the slot insulation. The two conductors I and II are separated from each other by a separator 12. The diagram also shows that, starting from the strands 14, which are advantageously constructed from copper or another highly electrically conductive material, each strand 14 firstly has strand insulation 13. The main insulation 11 of conductor I or conductor II is then radially outwardly attached thereto, which is then separated further from the laminated core of the stator 2 by a glass fabric cover strip 10 and the slot liner 9.

The entire arrangement in this slot 20 and the other slots of the stator 2 and/or rotor 5 is covered by a slot blanking plate 8.

This construction shows how laborious and complicated the positioning of the electrical conductors I, II in the slot is. Incorrect assembly cannot be ruled out in this connection since slipping or ripping of the respective layer can by all means occur during insertion of the winding system with its insulating layers.

The inventive principle according to FIG. 3 now substantially simplifies the method of insulating. In a slot 20 with a two-layer winding with conductors I and II the conductors are positioned and insulated by inventive spacers and a predefined encapsulation.

During production of the winding system 3, 6 in the stator 2 or rotor 5 firstly a pre-formed coil, i.e. conductor I or conductor II, is produced from solid strands or from insulated wires, with these pre-formed coils of conductors I and II, radially layered one above the other, then forming part of the winding system 3, 6 and being provided in certain sections, as shown in FIG. 4, with spacers 16. The structural design and method is not limited to just two-layer windings, but may also be implemented in a single-layer or multi-layer winding.

In a further embodiment (not shown) the strands 14 of a conductor may also be arranged side by side and/or radially one above the other.

In the present case a core with a spacer 16 is now firstly positioned on the bottom 22 of the slot 20 and then a further spacer 16 is positioned with its conductor II on the first layer. This positioning ensures that the conductor II in the slot region 18 has an equidistant, predefined spacing from the earthed laminated core of the stator 2 or rotor 5 over the entire axial length of the stator 2 or rotor 5. An insulating material which, after curing, forms a stable composite of the entire winding system 3, 6, can thereby now be introduced by an encapsulation method into these remaining cavities in the slot 20. This simplifies production compared to the procedure illustrated in FIG. 2 considerably and is far less error-prone.

As in the present example according to FIG. 3, the spacer 16 is provided with a profiling, in particular with teeth, which facilitate fixing of the spacers 16 in the slot 20.

If it is positioned at the slot opening, the spacer 16 has a catch 17, with at least one tooth of the spacer 16 engaging in an axially running recess of the tooth of the laminated core. A slot blanking plate 8 for covering the winding system 3, 6 in the slot 20 is therefore not imperative.

These spacers 16 may also be positioned in the slot 20 by adhesive joints.

FIG. 4 shows an electrical conductor in a slot 20, with spacers 16 being positioned in the slot 20 so as to be axially distributed over the slot region 18 in order to fix the conductor for the encapsulation process.

The invention claimed is:

1. A dynamoelectric rotary machine, comprising:
    a stator and a rotor spaced from the stator to define an air gap there between, at least one of the stator and the rotor including a laminated core made from axially layered laminations and having slots configured to extend to the air gap;
    pre-formed coils received in the slots, each said pre-formed coil being embedded in thermosetting encapsulation in the slots and having integral electrically conductive material or pre-insulated or coated electrical conductive wires;
    spacers arranged in axially spaced-apart relationship to hold the pre-formed coils in the slots, each of said spacers having triangular teeth resting against a confronting flat side wall of the slot such as to define cavities between neighboring teeth and to secure the spacer in place b frictional force; and
    insulating material received in the cavities between the teeth of the spacer and further strengthening a securement of the spacer in the slot.

2. The dynamoelectric rotary machine of claim 1, wherein the spacers are made of thermosetting or thermoplastic material with inorganic or organic fillers.

3. The dynamoelectric rotary machine of claim 1, wherein the spacers have a surface finish which is roughened, porous or coated or is soluble by way of encapsulation medium.

4. The dynamoelectric rotary machine of claim 1, wherein the cavities are of triangular configuration.

5. A method for producing a rotor or stator of a dynamoelectric rotary machine as set forth in claim 1, said method, comprising:
    fixing spacers to the pre-formed coil of the dynamoelectric rotary machine at predefinable axial intervals;
    inserting the pre-formed coils with the spacers into slots in a laminated core of the dynamoelectric rotary machine such that triangular teeth of the spacers rest against confronting flat side walls of the slots and secure the spacer in place by frictional force;
    contacting the individual pre-formed coils such as to form groups of coils and forming a winding system in accordance with a predefined circuit plan; and
    introducing insulating material into cavities between the teeth of the spacers to thereby insulate the winding system in the slots by encapsulation and further strengthening a securement of the spacer in the slot.

6. The method of claim 5, wherein the winding system is insulated in the slots by vacuum encapsulation.

* * * * *